United States Patent [19]
Lemons

[11] 3,940,606
[45] Feb. 24, 1976

[54] HIGH INTENSITY SPOTLIGHT

[75] Inventor: Thomas M. Lemons, Marblehead, Mass.

[73] Assignee: Lighting Development Co., Needham Heights, Mass.

[22] Filed: July 19, 1974

[21] Appl. No.: 490,052

[52] U.S. Cl.... 240/41 R; 240/11.4 R; 240/41.35 R; 240/52 R
[51] Int. Cl.² .......................................... F21M 7/00
[58] Field of Search ........... 240/41 R, 41 A, 11.4 R, 240/3, 3.1, 41.35 R, 44.2, 52 R; 313/113

[56] References Cited
UNITED STATES PATENTS

| | | | |
|---|---|---|---|
| 2,950,382 | 8/1960 | Hatch | 240/3.1 |
| 3,540,805 | 11/1970 | Mortensen | 240/44.2 X |
| 3,624,386 | 11/1971 | Plumadore | 240/44.2 |
| 3,648,045 | 3/1972 | Vantine et al. | 240/44.2 |
| 3,758,769 | 9/1973 | Pichel | 240/44.2 X |

Primary Examiner—Richard L. Moses
Attorney, Agent, or Firm—Barlow & Barlow

[57] ABSTRACT

A light projecting apparatus consists of a concave, substantially prolate-spheroidal reflector having a major axis coincident with the optical axis of the apparatus and a metal halide high intensity discharge source positioned at a first focal point of the reflector and inclined with respect to the optical axis of the apparatus at an angle of approximately 30°.

7 Claims, 3 Drawing Figures

HIGH INTENSITY SPOTLIGHT

BACKGROUND OF THE INVENTION

This invention relates to light projectors and particularly to spotlights of the theatrical type for projecting an adjustable high intensity beam of light and is particularly adapted for use in theaters, auditoriums, arenas and the like where a spotlight more compact than the conventionally available spotlight is desired.

In the prior art it is conventional to have a spotlight consisting of a brilliant source of light placed in front of a concave reflector which gathers some of the emitted light from the source and directs it toward an aperture usually controlled by a shutter and an iris. Light emitted from the source and reflected from the reflector travels through the opened shutter and iris to a condensing lens adjacent to the iris and then to a front lens system which projects the light in a beam toward the desired object. Newer spotlights of this type have been developed utilizing spaced electrical discharge electrodes contained in part in a sealed gas filled envelope. When operated by applying the appropriate electrical power, a brilliant light source is emitted from the space between the two opposed electrodes, the space containing an arc flame. Conventionally two methods have been utilized for positioning such a source with respect to the reflector.

In a first method typified by U.S. Pat. No. 3,173,617 the source is mounted such that the two opposed electrodes form a line perpendicular to the optical axis of the projector and lie in a plane somewhat in front of the plane defined by the leading edge of the reflector. Assuming the reflector to be ideal, that is no energy lost upon reflection, the amount of light directed by the reflector toward the aperture of the apparatus is considerably less than 50 percent of the emitted light since over half the emitted light is emitted in the forward direction thus never reaching the reflector.

A second method consists of mounting the source such that the electrodes of the source are coincident with the optical axis of the system as shown in U.S. Pat. No. 3,624,386 and U.S. Pat. No. 3,702,395. While increased optical efficiency can be experienced since a greater portion of the emitted light from the source is gathered by the reflector and is directed toward the aperture system, it is necessary that the system be designed such that the front terminal of the forward directed electrode intersect as little light as possible since the light intersecting the electrode will heat the electrode. If the amount of light intersected by the front electrode becomes too great, the end of the lamp will suffer damage and will become inoperative.

It has been the practice in the past to choose a reflector having a diameter substantially larger than the length of the source and having a focal length two to three times the length of the source. Central sections of the reflector have been eliminated to insure that little or no radiation intersects with the front terminal of the axially mounted source. The long focal length requirement of such a reflector contributes to the overall size of the projector by requiring the distance between the aperture and the reflector be one and one-half to three times the length of the source.

Ellipsoidal reflectors have been used in combination with incandescent lamps where the lamp bulb was inclined with respect to the optical axis of the reflector much like U.S. Pat. No. 2,769,082. Since the incandescent bulb has no forwardly directed electrode which needs to be protected from heat, little appreciation of the problems involved has been found in the prior art of this type.

SUMMARY OF THE INVENTION

The increase in light gathering efficiency which is experienced by axial placement of the source can be enjoyed while maintaining the operating temperature of the forward facing electrode of the source within an acceptable margin of safety by placing the light source obliquely with respect to the axis of the reflector and choosing a reflector having a focal length from one-half to one and one-quarter times the length of the source. This substantially smaller focal length of the reflector decreases the required length of the whole spotlight by up to 30%. The overall efficiency of the system is maximized by increasing the portion of light gathered by the reflector and utilizing a substantially shorter focal length reflector to direct the light toward the aperture.

The envelope-enclosed arc source is positioned at the first focal point of an ellipsoidal mirror and angled with respect to the optical axis of that mirror of an angle between 25° and 35°. A major portion of the light emitted from the arc source is reflected by the condensing reflector through the aperture of the system toward the second focal point of the substantially ellipsoidal reflector. The angular positioning of the source with respect to the optical axis of the system may require a slight modification of the reflector from a true prolate-spheroid so as to provide a light of even intensity across the aperture.

It is a principal object of this invention to provide a spotlight of high efficiency by placing a source at an oblique angle with respect to the principal axis of a substantially ellipsoidal reflector thereby allowing a significant reduction in the reflectors focal length and diameter.

As another object the present invention aims to provide an improved spotlight source by using a concave substantially prolate-spheroidal reflector having a front circular opening lying in a plane normal to the major axis of the reflector and a rear circular opening the central portion of which lies in a a plane normal to a line passing through a first focal point of the reflector and angled at an angle of approximately 30° with respect to the major axis of the reflector.

Still another object of this invention is to provide the combination of a substantially elliptical reflector with a metal halide high intensity discharge lamp which is inclined with respect to the major axis of the reflector at an angle of approximately 30°. Other objects and advantages of the invention will become apparent from the following description of preferred embodiment when read in conjunction with the accompanying figures and the appended claims.

DESCRIPTION OF THE PREFERRED EMBODIMENT

Figure 1:
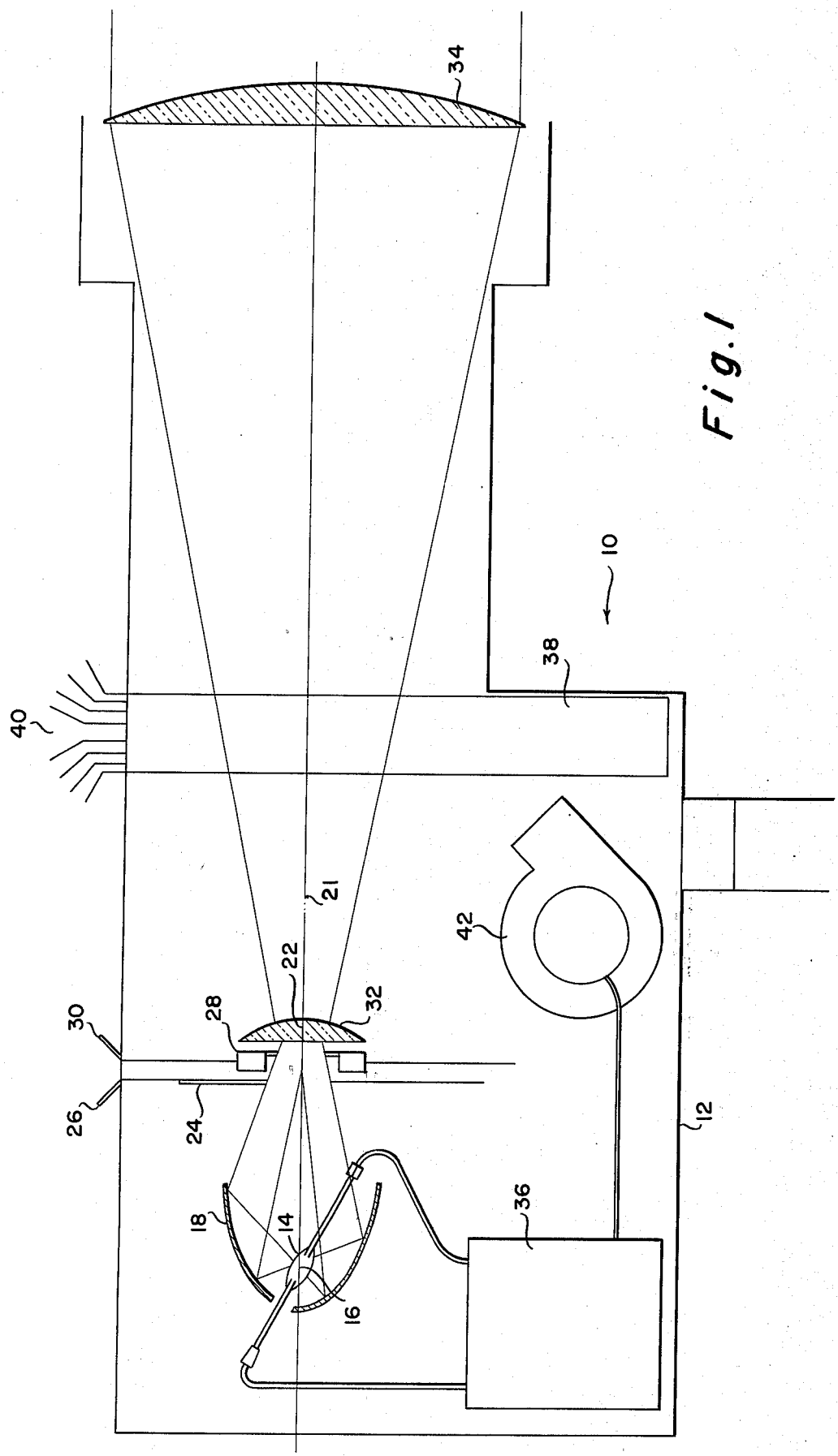
FIG. 1 is a diagrammatic illustration of an improved spotlight according to the present invention.

As shown diagramatically in FIG. 1, a spotlight 10 comprises generally a housing 12 containing a source of light 14 positioned at the first focal point 16 of an ellipsoidal reflector 18 having a major axis 20 which passes through a first focal point 16 and a second point 22 and defines the optical axis 21 of the spotlight. The spotlight 10 further comprises a shutter 24 controlled by shutter control 26, an iris 28 controlled by iris control 30, a plano-convex condenser lens 32, and a front lens system 34. The spotlight also comprises a source power system 36, a bank of color media or color filters 38 controlled by color media or filter controls 40, and means 42 for circulating cooling air within the spotlight housing 12.

Figure 2:
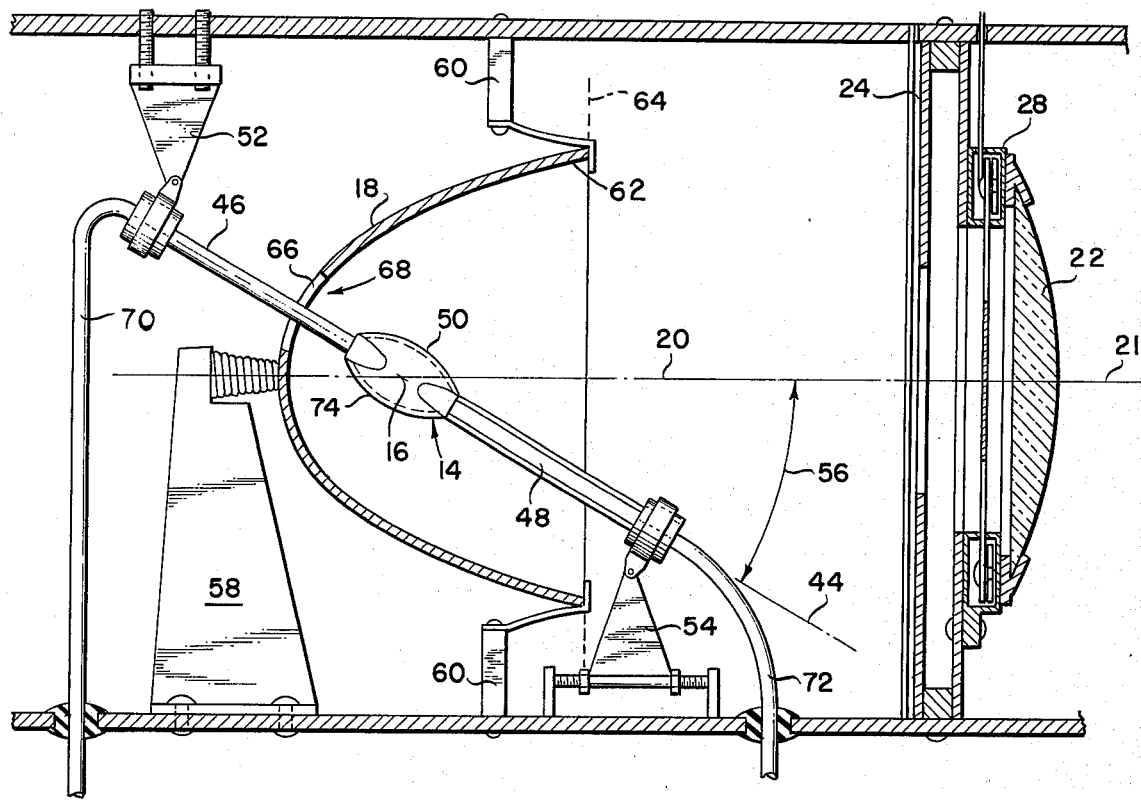
FIG. 2 is a detailed diagrammatic illustration of the spotlight of FIG. 1.

The source 14 has a longitudinal axis 44 defined by the extension of the two opposed, spaced apart electrodes 46 and 48, as shown in FIG. 2. The source 14 is positioned such that the space 50 between the electrodes 46 and 48 is centered on the first focal point 16 of the concave, substantially prolate-spheroidal reflector 18 by means for positioning the source such as brackets 52 and 54. The means for positioning the source also maintains the source at a fixed angle 56 of approximately 30° with respect to the major axis 20 of the reflector 18. Means for maintaining the reflector in position, such as bracket 58 and clips 60, maintain the reflector such that its major axis 20 coincides with the optical axis 21 of the spotlight. The reflector 18 has a circular front edge 62 which defines a plane 64 which is normal to the major axis 20. The radius of the circular front edge 62 measured in plane 64 is less than the semi-minor axis of the prolate-spheroid which coincides with the reflector 18. The reflector 18 has a circular rear edge 66 defining an opening 68 through which electrode 46 extends. The circular opening 68 is inclined with respect to the major axis 20 of reflector 18, extending from approximately 50° at its greatest angular departure to approximately 10° at its closest angular approach to the optical axis 20, the angles measured from the first focal point 16 of the reflector 18. Stated in other terms, the circular opening 68 intersects a solid angle of less than 0.4 steradians measured from the first focal point 16. The rear opening 68 is adapted to receive the first electrode 46 which extends from the space 50 to the positioning bracket 52 and is there connected to power conductor 70. The second electrode 48 extends in the opposite direction from space 50 through plane 64 to bracket 54 and there connects to power conductor 72. The power conductors 70 and 72 are connected to an appropriate source of power which provides the light source 14 with the correct operating voltages and currents. The space 50 is enclosed by an elliptical or tubular-shaped closing element 74 typically made of glass or fused silica.

The preferred source of a spotlight of this type is a metal halide high intensity discharge lamp developed by OSRAM GmbH and marketed under the trademark METALLOGEN. This lamp has electrodes consisting of molybdenum foils sealed into quartz glass closing elements or bulbs and connected to nickelcoated brass electrodes extending from the bulb to the electrical connection. The atmosphere within the bulb consists primarily of mercury and argon, as well as some rare earth metal iodides and bromides, such as, dysprosium, holmium and thulium. The presence of the rare earth metals insures a nearly continuous multiline spectrum of radiation throughout the visible range, thereby achieving maximum color quality. The typical length of a twelve hundred watt source of this type is approximately 22 centimeters. This source requires an operating voltage of approximately 100 volts A.C. at 13.8 amps with suitable ballasting and ignition circuitry. The distinct advantage of this source is that it may be operated at any angular position with respect to the gravitational field with no significant displacement of the arc flame. Other sources having similar operating characteristics may, of course, be used.

Figure 3:
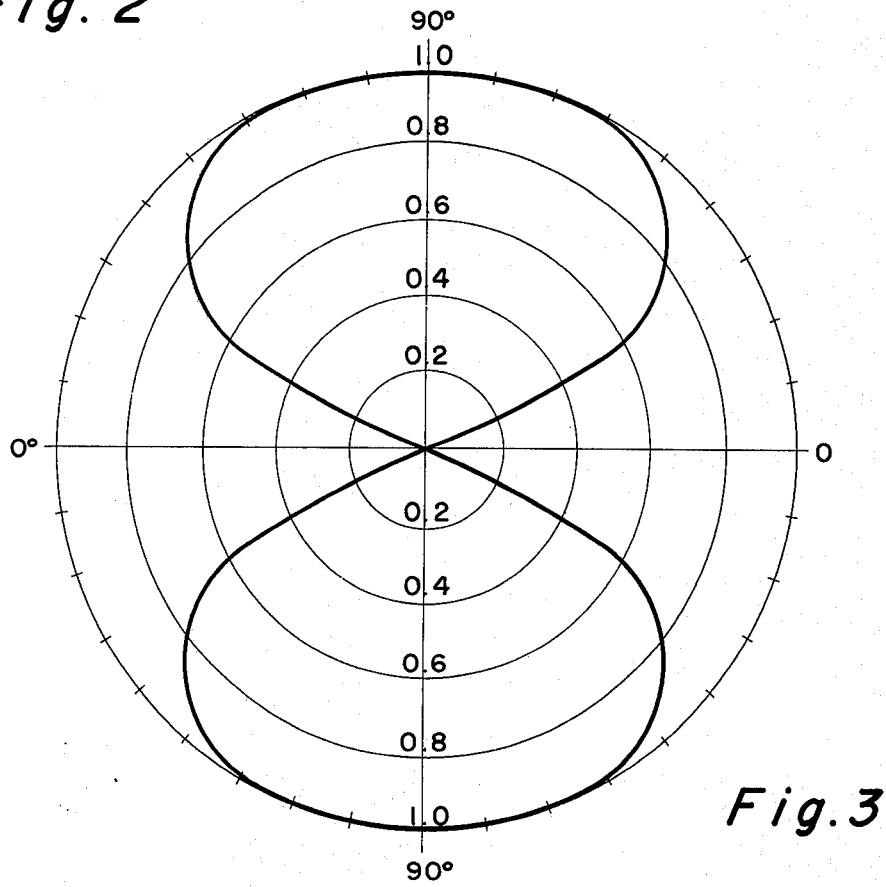
FIG. 3 is a graph of the normalized luminous intensity distributed by sources of this type as a function of angle from the electrode axis.

Sources of this general type, unlike incandescent sources having the same power output, emit the light from what may be considered a single point but preferentially radiate in a "doughnut" fashion as illustrated in FIG. 3. The preferential direction of radiation leaves a cone-shaped shadow cast over each electrode, the apex angle of each shadow being approximately 45°.

When the source is positioned as herein shown and described, the upper electrode 46, which intersects no radiant light, tends to conduct excess heat up and away from space 50 to bracket 52. The lower electrode 48, by being displaced from the optical axis 21, intersects a minimum amount of light energy radiated by the source, thereby achieving acceptably cool operation not exceeding 250°C outside of the sealed bulb 74. Some heat is conveyed from lower electrode 48 to bracket 54 and along conductor 72. This low temperature operation could not be maintained if the angle 56 between the source axis 44 and the optical axis 21 were significantly decreased. On the other hand, a significant reduction in the light-gathering efficiency of reflector 18 would be experienced if angle 56 were significantly increased. The optimum size for angle 56 lies between 25° and 35°, and it is further believed that an angle of approximately 30° results in optimum optical efficiency while maintaining the operating temperature of electrode 48 within an acceptable margin of safety.

What is claimed is:

1. A light projecting apparatus comprising a concave, substantially prolate-spheroidal reflector having on the major axis thereof a first and a second focal point within and remote from the reflector respectively, a high intensity halide source positioned at said first focal point, the source having a opposed electrodes defining a source axis which is inclined with respect to said major axis at an angle between 25° and 35°.

2. The light projecting apparatus of claim 1 wherein the intersecting source axis and major axis define a substantially vertical plane.

3. The light projecting apparatus of claim 1 wherein the reflector has a front circular opening lying in a plane perpendicular to said major axis, the radius of said circular opening being less than the semi-minor axis of a prolate-spheroid of the same dimension as the reflector.

4. The light projecting apparatus of claim 1 wherein the reflector has a rear circular opening, the central portion of said opening lying in a plane normal to a line passing through the first focal point, said line inclined with respect to said major axis at approximately 30°.

5. The light projecting apparatus of claim 4 wherein said rear circular opening intersects a solid angle of less than .4 steradians when measured from said first focal point.

6. The light projecting apparatus of claim 1 wherein said source axis is inclined with respect to said major axis at an angle of approximately 30°.

7. A light projecting apparatus comprising a concave, substantially prolate-spheroidal reflector having on the major axis thereof a first and a second focal point within and remote from the reflector respectively, said reflector having a front circular opening lying in a plane perpendicular to said major axis, the radius of said circular opening being less than the semi-minor axis of a prolate-spheroid of the same dimension as the reflector, the reflector having a rear circular opening whose central portion lies in a plane normal to a line passing through said first focal point, said line inclined with respect to said major axis at approximately 30°, said rear circular opening intersecting a solid angle of 0.4 steradians when measured from said first focal point, a high intensity halide source positioned at the first focal point, the source having a first and a second spaced-apart opposed electrode, the line passing through the length of said electrodes defining a source axis, said source axis being inclined with respect to said major axis at an angle between 25° and 35°, said source axis and said major axis lying in a substantially vertical plane, said first electrode being wholly above said major axis and extending through said rear circular opening, said second electrode being wholly below said major axis and extending through said front circular opening.

* * * * *